United States Patent Office 3,017,322
Patented Jan. 16, 1962

3,017,322
5-FLUOROURACIL COMPOSITIONS FOR TREATING COCCIDIOSIS
Joseph J. Ursprung, Waterford, Conn., assignor to Chas. Pfizer & Co., Inc., Brooklyn, N.Y., a corporation of Delaware
No Drawing. Filed Oct. 9, 1959, Ser. No. 845,308
8 Claims. (Cl. 167—53.1)

This invention relates to novel chemotherapeutic compositions for use in veterinary medicine. More particularly, it is concerned with new and useful coccidiostatic compositions as well as with a method of treatment therewith.

Coccidiosis is a protozoan disease that affects the intestinal tract of many animals and it is especially prevalent among poultry, sheep, calves, immature birds and mammalian livestock. This disease is caused by a group of closely related animal parasites known as "coccidia." One species of this genus, *Eimeria tenella*, is responsible for the cecal or acute type of coccidiosis which is characterized by a severe hemorrhage on or about the fifth day after infection. The critical significance of this disease and the economic losses brought about by its infection of chicks can be appreciated when it is realized that approximately 12–20% of all chicks hatched in this country die from cecal coccidiosis before they attain the age of one month. Furthermore, large populations of mammals are constantly infected by this disease, and the resultant weight loss and downgrading of the stock caused by subsequent debilitation amounts to an enormous economic loss as measured in terms of millions of dollars annually. Consequently, extensive research has been conducted in the past by numerous investigators in order to find new and more effective coccidiostats.

In accordance with the prior art, a wide variety of different agents have been employed as remedies for the treatment of coccidiosis, including sulfur, the sulfa drugs and the arsenicals to mention but a few. However, these commercially available remedies are not completely satisfactory in every respect as they all exhibit a number of common deficiencies or drawbacks. For instance, many of these agents have been found to be relatively toxic and/or to exhibit a low order of activity or to possess a limited anticoccidial spectrum. Furthermore, they are often too expensive for widespread use, such as in poultry husbandry particularly in view of the high concentration levels at which they must be used in order to achieve effective results. Thus, a definite need exists in this particular art for a highly effective coccidiostat which is extremely well-tolerated in animal hosts in addition to being relatively inexpensive.

In accordance with the present invention, the foregoing need is filled by the completely unexpected discovery that 5-fluorouracil has been found to possess valuable anticoccidial properties without exhibiting any of the previously enumerated disadvantageous side effects or drawbacks which attend the prior art remedies. This finding is truly surprising and unforeseeable when one considers that such closely related compounds as uracil, 5-chlorouracil, 5-bromouracil, and the like possess little or no anticoccidial activity. As will be well understood by those skilled in the art, this particular physiologically active organic nitrogen heterocycle is acidic in nature and consequently, it is capable of forming various non-toxic metallic and amine addition salts, including the ammonium salt, which are to be regarded as equivalents of 5-fluorouracil as hereinafter indicated. Among the manifold advantages afforded by the novel anti-coccidial agents of this invention are the following: they exhibit the aforesaid anticoccidial activity to a considerably high degree and they are particularly effective against *E. tenella*; they are relatively non-toxic when employed at therapeutic levels; and finally, they are readily prepared by standard synthetic methods which are extremely feasible to operate and which entail the use of readily available starting materials [e.g., see R. Duschinsky et al. in the Journal of the American Chemical Society, vol. 79, p. 4559 (1957)].

In accordance with the process of this invention, the infecting coccidium is contacted in the intestinal tract with a chemotherapeutically-effective amount of 5-fluorouracil or with one of its salts of the aforementioned type. Preferred metallic salts in this connection include the alkali metal and alkaline-earth metal salts of 5-fluorouracil, including the magnesium salt, as well as such heavy metal salts as the manganese, copper, zinc, iron and cobalt salts of this particular acidic compound. Preferred amine addition salts of 5-fluorouracil include the ethanolammonium, diethylammonium, triethylammonium, pyridinium and piperidium salts. These particular anticoccidial agents may be administered to the animal alone, but they are preferably administered in conjunction with a suitable inert carrier, such as a pharmacologically acceptable animal feed. Although such administration is most conveniently carried out via the oral route, it is also possible to administer the coccidiostatic compound via the rectum. Needless to say, the actual daily dose required will vary to some extent depending upon the particular composition employed as well as on the particular subject being treated.

In accordance with a more specific embodiment of the process of this invention, it has been found that a highly satisfactory coccidiostatic effect is achieved when 5-fluorouracil or one of its aforesaid salts is used in nutritionally balanced animal feeds at concentration levels as low as 0.01% by weight of the total composition. In general, the 5-fluorouracil component may be used in such feeds at concentration levels ranging from about 0.01% to about 0.2% by weight of the total weight of the composition in order to obtain the unusually high degree of anticoccidial activity previously indicated. The use of still larger amounts of the 5-fluorouracil component has no particular value in this connection. However, if the coccidial condition encountered in an infected animal is of a particularly severe nature, the level of the anticoccidial agent may be substantially increased with subsequent control of the infection, even if it is due to a resistant strain of microorganism. Although some coccidiostatic effect may be obtained by using less than 0.01% by weight of the 5-fluorouracil component, such results are usually variable so that it is not ordinarily advisable to employ appreciably lesser amounts of active ingredients.

Although the aforesaid active ingredients have been found effective in the treatment of a wide variety of animals, such as sheep, calves and various livestock, they are all particularly valuable and outstanding in the case of poultry. The 5-fluorouracil compound may, of course, be administered in one component of the feed or it can be blended uniformly throughout a mixed feed. Alternatively, it is also possible to administer this agent via the animal's drinking water especially if the 5-fluorouracil compound employed is a water soluble salt. Among the wide variety of different feed components which may be employed in the nutritional diets of this invention are those suggested in the authoritative pamphlet entitled "Recommended Nutrient Allowances for Poultry," National Research Council, Washington, D.C. (1944). For instance, recommended feed compositions contain from about 50% to about 80% of grains, from about 3% to about 10% of animal protein, from about 5% to about 30% of vegetable protein and from about 2% to about 4% of mineral constituents, together with supplementary vitaminaceous sources. Needless to say, it is to be understood that the 5-fluorouracil component may be used in such poultry feeds in conjunction with other therapeutic agents such as the sulfa drugs, the arsenicals and various antibiotics; typical examples of these agents would include sulfaquinoxaline, phenylarsonic acid, penicillin, streptomycin, chloramphenicol, oxytetracycline, chlortetracycline, tetracycline, oleandomycin, and so forth.

The novel anticoccidial agents of this invention can be prepared by any number of different methods generally familiar to those skilled in the field of organic chemistry and they are preferably synthesized via the previously referred to procedure of R. Duschinsky et al., which involves reacting methyl formate with ethyl α-fluoroacetate and then condensing the resulting intermediate with ethyl isothioronium bromide to form 2-ethylmercapto-4-hydroxy-5-fluoropyrimidine; subsequent acid hydrolysis of the latter compound affords 5-fluorouracil which is then easily converted to the corresponding salts, if so desired, by means of standard procedures well-known to those skilled in the art. For instance, such salts can be prepared by contacting 5-fluorouracil with a relatively non-toxic inorganic or organic basic agent of the type which is capable of forming the desired aforementioned salts. Such agents include alkali metal and alkaline-earth metal hydroxides and carbonates, as well as those of manganese (manganous), copper (cuprous), zinc, iron (ferrous), and cobalt (cobaltous), in addition to ammonia and various amines like ethanolamine, diethylamine, triethylamine, pyridine, piperidine, and so forth.

This invention is further illustrated by the following examples, which are not to be construed as imposing any limitations on the scope thereof. On the contrary, it is to be clearly understood that resort may be made to various other embodiments, modifications and equivalents thereof which readily suggest themselves to those skilled in the art without departing from the spirit of the present invention and/or the scope of the appended claims.

*Example I*

Six groups of twenty 8-day old chicks are kept in electrically heated cages placed on raised wire floors and fed a basal diet having the following composition:

| Ingredients: | Diet (lbs.) |
|---|---|
| Ground yellow corn | 56.44 |
| 44% solvated soybean meal | 26.94 |
| Corn gluten meal | 2.50 |
| Alfalfa meal | 2.00 |
| Stabilized animal fat | 1.50 |
| Fish meal | 4.00 |
| Dried corn distillers' solubles | 1.00 |
| Dried whey (50% delactosed) | 1.00 |
| Dried brewers yeast | 1.50 |
| Iodized salt | 0.40 |
| Calcium carbonate | 1.30 |
| Calcium phosphate, dibasic | 1.00 |
| Delamix[1] | 0.10 |
| DL-Methionine | 0.01 |
| Vitamin A (10,000 I.U./g.) | 0.05 |
| Vitamin B$_{12}$ | 0.020 |
| Vitamin D$_3$ (1,500 I.C.U./g.) | 0.05 |
| Riboflavin | 0.05 |
| DL-Calcium pantothenate | 0.001 |
| Niacin | 0.001 |
| Choline chloride 25% | 0.125 |
| N,N'-(Diphenyl)phenylenediamine | 0.0125 |
| | 100.0000 |

[1] Delamix is a commercially available trace mineral mix containing 27% calcium, 6% manganese, 2% iron, 0.2% copper, 0.12% iodine, 0.02% cobalt and 0.006% zinc.

The compound, 5-fluorouracil is mixed with parts of this diet to provide compositions having 0.01%, 0.025%, 0.05%, 0.10% and 0.20% parts by weight of the active component, respectively. The chicks are allowed to feed freely. Twenty-four hours later, the chicks are inoculated orally with the coccidium *E. tenella*. A similar group of chicks of identical number are fed the conventional diet alone an inoculated as aforesaid for control purposes. The control chicks (infected controls) become sick the fifth day after infection. After eight days, the efficacy of the treatment is determined by sacrificing the surviving chicks and macroscopically examining the ceccum. Based on lesion score legend of 1 for a slight infection, 2 for a moderate infection, 3 for a severe infection and 4 for a fatality, it was found that the treated chicks had a lesion score of 1.2 as compared with a corresponding value of 3.8 for the infected controls when 5-fluorouracil was employed at the 0.025% concentration level. Comparable results are also obtained when 5-fluorouracil is employed at the other concentration levels previously indicated.

In like manner, other coccidium species, such as *E. acervulina, E. nectatrix, E. hagani, E. mitis, E. praecox* and *E. brunetti*, which are responsible for the chronic intestinal type of coccidiosis, are similarly combatted.

*Example II*

Medium-sized white turkey poults infected with coccidiosis are treated in the manner of the previous example with a nutritionally balanced diet having the composition illustrated below and containing 5-fluorouracil at a concentration level of 0.025% by weight of the total composition:

| Ingredients: | Diet (lbs.) |
|---|---|
| Fine ground yellow corn | 56.48 |
| 44% Solvated soybean meal | 26.94 |
| Corn gluten meal | 2.50 |
| Alfalfa meal, 17% dehydrated | 2.00 |
| Stabilized animal fat | 1.50 |
| Fish meal | 4.00 |
| Dried corn distillers' solubles | 1.00 |
| Dried whey (50% delactosed) | 1.00 |
| Dried brewers yeast | 1.50 |
| Iodized salt | 0.40 |
| Calcium carbonate | 1.30 |
| Calcium phosphate | 1.00 |
| Delamix[1] | 0.10 |
| DL-Methionine | 0.01 |
| Vitamin A (10,000 I.U./g.) | 0.05 |
| Vitamin B$_{12}$ | 0.020 |
| Vitamin D$_3$ (3,000 I.C.U./g.) | 0.025 |
| Riboflavin | 0.05 |
| DL-Calcium pantothenate 45% | 0.001 |
| Niacin | 0.001 |
| Choline chloride 25% | 0.125 |
| | 100.000 |

[1] Delamix is a commercially available trace mineral mix containing 27% calcium, 6% manganese, 2% iron, 0.2% copper, 0.12% iodine, 0.02% cobalt and 0.006% zinc.

The results obtained indicate that the coccidial infection is effectively controlled by 5-fluorouracil at this concentration level. Substantially similar results are also obtained when the 5-fluorouracil component is employed at various other concentration levels ranging from 0.01% to 0.2% by weight of the total weight of the composition.

*Example III*

The monosodium salt of 5-fluorouracil is prepared by dissolving the latter compound in an aqueous solution containing an equimolar amount of sodium hydroxide. Concentration of the resultant solution under reduced pressure affords the desired sodium salt. In like manner, the monopotassium, monolithium, calcium, strontium, barium, magnesium, manganous, cuprous, zinc, ferrous and cobaltous salts of 5-fluorouracil are similarly prepared by merely employing the appropriate metal hydroxide in each case. When two moles of each of the aforementioned alkali metal hydroxides are employed with respect to one mole of 5-fluorouracil in accordance with this very same reaction procedure, the corresponding dialkali salts are the products obtained.

*Example IV*

The procedure of Example I is followed except that the monosodium salt 5-fluorouracil is employed in the feed as the anticoccidial agent in lieu of the parent compound. In the same manner, the monopotassium, monolithium and disodium salts of 5-fluorouracil are also each individually employed in place of the parent compound as the active component in these feeds. In each of these cases, the results obtained are substantially the same as those previously reported for 5-fluorouracil.

In like manner, the procedure of Example I is followed except that such metallic salts of 5-fluorouracil as the calcium, strontium, barium, magnesium, manganous, cuprous, zinc, ferrous and cobaltous salts are each individually used in lieu of the parent compound with comparable results being obtained in each case.

*Example V*

The ammonium salt of 5-fluorouracil is prepared by dissolving said acidic organic compound in dilute ammonia (one volume of concentrated ammonia and two volumes of water). The resulting solution is then evaporated to dryness under reduced pressure by heating same on a steam bath, and the desired salt is obtained as a crystalline residue. In like manner, the ethanolammonium, diethylammonium, triethylammonium, pyridinium and piperidinium salts of 5-fluorouracil are similarly prepared by merely employing the appropriate amine in lieu of ammonia.

*Example VI*

The procedure of Example I is followed except that the ammonium salt of 5-fluorouracil, prepared as described in the previous example, is employed in the feed as the anticoccidial agent in lieu of the parent compound. In the same manner, the amine addition salts prepared in Example V are also each individually employed in place of the parent compound as the active component in this feed. In each of these cases, the results obtained are substantially the same as those previously reported for 5-fluorouracil.

What is claimed is:
1. A coccidiostatic composition for veterinary use comprising a nutritionally balanced animal feed as the carrier and a compound selected from the group consisting of 5-fluorouracil and non-toxic salts thereof as the anti-coccidial agent, said agent being present in said feed at a concentration level that is in the range of from about 0.01% to about 0.2% by weight of the total weight of the composition.

2. A coccidiostatic composition for combatting coccidiosis in poultry comprising a nutritionally balanced poultry feed as the carrier and a compound selected from the group consisting of 5-fluorouracil and non-toxic salts thereof as the anticoccidial agent, said agent being present in said feed at a concentration level that is in the range of from about 0.01% to about 0.2% by weight of the total weight of the composition.

3. A process for treating coccidiosis in the intestinal tract of an infected animal, which comprises contacting the coccidium in said intestinal tract with a chemotherapeutically-effective amount of a compound selected from the group consisting of 5-fluorouracil and non-toxic salts thereof.

4. A process for combatting coccidiosis in animals which have been exposed to said disease, which comprises orally administering thereto a coccidiostatic composition comprising a nutritionally balanced animal feed having distributed therein a chemotherapeutically-effective amount of a compound selected from the group consisting of 5-fluorouracil and non-toxic salts thereof.

5. A process for treating coccidiosis in animals, which comprises orally administering to the infected host a coccidiostatic composition comprising a nutritionally balanced animal feed as the carrier and at least about 0.01% by weight of a compound selected from the group consisting of 5-fluorouracil and non-toxic salts thereof.

6. A process for effectively controlling coccidiosis in animals, which comprises orally administering to the infected host a coccidiostatic composition comprising a nutritionally balanced animal feed as the carrier and from about 0.01% to about 0.2% by weight of a compound selected from the group consisting of 5-fluorouracil and non-toxic salts thereof.

7. A process for combatting coccidiosis in poultry which have been exposed to said disease, which comprises orally administering to said poultry a chemotherapeutically-effective amount of a compound selected from the group consisting of 5-fluorouracil and non-toxic salts thereof.

8. A process for combatting coccidiosis in poultry which have been exposed to said disease, which comprises orally administering to said poultry a nutritionally balanced poultry feed containing from about 0.01% to about 0.2% by weight of a compound selected from the group consisting of 5-fluorouracil and non-toxic salts thereof.

References Cited in the file of this patent
UNITED STATES PATENTS 2,802,005    Heidelberger _____ Aug. 6, 1957

OTHER REFERENCES

J.A.C.S., vol. 79, Aug. 20, 1957, pages 4559 and 4560.